3,287,413
HYDROLYSIS OF ALLYLIC HALIDES
Lawrence J. Hughes, Hitchcock, Tex., assignor to Monsanto Company, St. Louis, Mo., a corporation of Delaware
No Drawing. Filed Dec. 27, 1963, Ser. No. 334,009
8 Claims. (Cl. 260—593)

The present invention relates to a method of producing carbonyl compounds, namely, saturated aldehydes and ketones, by hydrolysis of allylic halides in the vapor phase.

It is well known that organic halides, especially the lower alkyl halides and allylic halide, can be hydrolyzed by treatment with water and a basic reacting agent to the corresponding alcohols. This reaction is a liquid phase one. It is equally well known that the allylic alcohols thus produced can then be subjected to a molecular rearrangement reaction to form saturated aldehydes or ketones. The reaction is also generally carried out in the liquid phase with an acid catalyst but it can be conducted in the vapor phase. It has now been discovered that the hydrolysis of allylic-type halides can be conducted in the vapor phase so as to convert the halides directly to the saturated aldehydes or ketones in a single step rather than in the two steps taught in the art. Allylic halides containing the allylic halogen on the terminal carbon atom are converted directly to aldehydes whereas the product of the vapor phase hydrolysis is a ketone when the allylic halogen is not on a terminal carbon atom.

According to the present invention, saturated aldehydes or ketones are produced directly from allylic halides by bringing the allylic halide in the vapor phase together with steam in contact with a Lewis-acid-type catalyst. The allyic halides to which the invention is directed are those of the formula

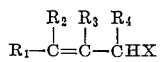

wherein X is a halogen and $R_1$, $R_2$, $R_3$, and $R_4$ may be hydrogen, alkyl, aryl, or aralkyl radicals but only one of $R_1$ and $R_2$ is aryl. Examples of allylic halides suitable as starting materials in the present invention include allyl chloride, allyl fluoride, methallyl chloride, methallyl iodide, 3-chlorobutene-1, 1-bromobutene-2, 1-chloropentene-2, cinnamyl chloride, 3-iodo-4-phenylbutene-1, 2-(chloromethyl)-3-phenylpropene or 2-benzyl allyl chloride, 2,3-dimethyl-4-chloropentene-2, 1,3-di-p-tolyl-2-methyl-3-chloropropene or 1,3-di-p-tolyl-methallyl chloride, and the like.

The reaction is conducted by passing the allylic halide in the gaseous phase admixed with steam through a reaction zone packed with a Lewis-acid-type catalyst. Or, if desired, a so-called fluidized catalyst technique may be used in which the catalyst in the form of finely divided particles is maintained in a state of turbulence in the reaction zone by the velocity of the feed gas mixture being introduced. Alternatively, also, a moving bed of catalyst may be used in the reaction zone. Typical of the catalysts which are suitable are, for example, alumina, alumina impregnated with a transition metal halide such as copper chloride, iron chloride, aluminum chloride and the like, molybdena on alumina, chromic oxide on alumina, silica, silica-alumina compositions, silica impregnated with a mineral acid such as phosphoric acid, clays such as kaolin, pumice, montmorillonite and the like impregnated with mineral acids such as phosphoric, hydrochloric or sulfuric acid, vanadium oxide on pumice, and like materials. Preferably, the catalyst employed should have an alkali metal or alkaline earth metal concentration of less than 0.1% and best results are obtained with catalysts having an alkali ion concentration less than 0.01%.

The molar ratio of steam to allylic halide which is employed must be at least 1:1 for complete hydrolysis to be effected. However, mole ratios anywhere from 1:1 to 10:1 can be employed. Preferably, the steam-allylic halide ratio is maintained in the range from about 2:1 to about 4:1. These ratios providing for an excess of steam are advantageous because they result in a lower concentration of the product aldehydes in the reaction mixture, thus minimizing the possibility of trimerization of the aldehydes.

The temperature employed for the vapor phase hydrolysis may be varied over a relatively wide range. The process is operative at temperatures from about 200° C. to about 400° C. depending upon the particular allylic halide starting material, the catalyst employed, and the contact time used. Preferably, temperatures are maintained in the range from 280° C. to 320° C. The reaction is advantageously run at atmospheric pressure but it can be conducted at higher pressures or at reduced pressure. However, superatmospheric pressures tend to promote tar formation whereas operation under vacuum tends to decrease the rate of reaction and thus lower conversions at fixed contact times. Contact times are not highly critical and those ranging from about 0.5 to about 20 seconds may be employed depending upon the particular catalyst and temperature used. Contact times of between about 2 and about 5 seconds are preferred since these provide for substantially complete conversion.

The invention is illustrated in the following examples which, however, are not to be construed as limiting it in any manner whatsoever.

*Example 1*

The reactor employed was a 22-mm. I.D. quartz tube 23 in. long, fitted with a 6-mm. O.D. thermowell and filled with alumina (manufactured by the Aluminum Company of America and marketed under the trade name Alcoa F–20). It was wrapped with Nichrome ribbon and covered with high temperature pipe insulation.

The reactor was heated while a stream of dry nitrogen was passed through it until the temperature had become stabilized at about 320° C. A feed mixture of steam and methallyl chloride in mole proportions of about 4:1 was prepared by feeding methallyl chloride drop-wise into a vessel with steam passing through it to vaporize the chloride. Steam inlet was governed by means of a rotameter and the drop-wise addition of the chloride was controlled at a rate to provide the desired mole ratio in the mixture. The feed mixture was passed from the combined vaporizer-mixer through the alumina in the reactor at a rate to provide a contact time of about 2 seconds.

The effluent gas was conducted through a cold water condenser, a Dry Ice trap, and a liquid nitrogen trap. The liquid condensate consisted of two phases, both of which were analyzed for HCl and aldehyde content and both of which gave a positive test with 2,4-dinitrophenylhydrazone indicating the presence of isobutyraldehyde as the product of the reaction. The organic phase of the condensate was combined with the organic phases from the cold traps and the resulting mixture likewise gave a positive test when analyzed for aldehyde content.

*Example 2*

A second run similar to that in Example 1 was made using the same catalyst, temperature, and contact time but employing a steam-to-methallyl chloride mole ratio of 2:1. At the end of the 30-minute reaction period, the aqueous phase of the condensate gave a positive dinitrophenylhydrazone test for aldehyde. This condensate was combined with the aqueous phase of the condensate from Example 1 to provide enough of the dinitrophenylhydrazone derivative to permit recrystallization from methanol. The identity of the crystalline product was established by means of its melting point of 184° C. as the dinitrophenylhydrazone derivative of isobutyraldehyde.

*Example 3*

The run of Example 2 was repeated over a reaction period of about three hours. The aqueous layer of the condensate obtained was diluted to 250 cc. and an aliquot (5 cc.) was titrated with sodium hydroxide. Calculations made from this analysis showed a conversion based on HCl of 27.2%. The organic layers collected from the condensate and the cold traps were combined and subjected to evaporation leaving a solid which was then recrystallized from methanol. The solid sublimed rapidly at 50° C. and when warmed with 2,4-dinitrophenylhydrazone, gave slow precipitation of the dinitrophenylhydrazone of isobutyraldehyde (melting point 183–4° C.).

*Example 4*

Following the procedure of the preceding examples, a mixture of steam and 3-chlorobutene-1 in mole proportions of about 2:1 is passed through a reaction zone packed with silica and maintained at a temperature in the range from about 280° to about 320° C. at a rate to provide a contact time of about 3 seconds. The reaction effluent is condensed, collected, and separated as described in the foregoing examples and methyl ethyl ketone is recovered therefrom in good yield.

What is claimed is:

1. The method of producing carbonyl compounds which comprises contacting an allylic halide of the formula

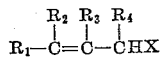

in which X is a halogen and $R_1$, $R_2$, $R_3$, and $R_4$ are chosen from the group consisting of hydrogen, alkyl, aryl, and aralkyl radicals but only one of $R_1$ and $R_2$ is aryl, in the vapor phase in admixture with steam in a mole ratio from about 1:1 to about 1:10 with a Lewis-acid-type catalyst at a temperature from about 200° to about 400° C.

2. The method of claim 1 wherein said catalyst is alumina.

3. The method producing isobutyraldehyde which comprises contacting methallyl chloride in the vapor phase in admixture with steam in a mole ratio from about 1:1 to about 1:10 with a Lewis-acid-type catalyst at a temperature from about 200° to about 400° C.

4. The method of claim 3 wherein said catalyst is alumina.

5. The method of producing isobutyraldehyde which comprises contacting a mixture of steam and methallyl chloride in molar proportions from about 2:1 to about 4:1 with alumina at a temperature in the range from about 280° to about 320° C. and a contact time from about 2 to about 5 seconds.

6. The method of producing methyl ethyl ketone which comprises contacting 3-chlorobutene-1 in the vapor phase in admixture with steam in a mole ratio from about 1:1 to about 1:10 with a Lewis-acid-type catalyst at a temperature from about 200° to about 400° C.

7. The method of claim 6 wherein said catalyst is alumina.

8. The method of producing methyl ethyl ketone which comprises contacting a mixture of steam and 3-chlorobutene-1 in molar proportions from about 2:1 to about 4:1 with alumina at a temperature in the range from about 280° to about 320° C. and a contact time from about 2 to about 5 seconds.

References Cited by the Examiner

UNITED STATES PATENTS

| | | | |
|---|---|---|---|
| 1,849,844 | 3/1932 | Lloyd et al. | 260—601 |
| 2,208,557 | 7/1940 | Amos et al. | 260—601 |

LEON ZITVER, *Primary Examiner.*

J. J. SETELIK, R. H. LILES, *Assistant Examiners.*